(12) United States Patent
Shim et al.

(10) Patent No.: US 8,904,505 B2
(45) Date of Patent: Dec. 2, 2014

(54) METHOD FOR ESTABLISHING A PROTECTED SETUP AND WIRELESS REGISTRATION REQUESTING DEVICE IMPLEMENTING THE SAME

(75) Inventors: Seung-seop Shim, Anyang-si (KR);
Yong-gu Kim, Seoul (KR); In-hwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 13/095,105

(22) Filed: Apr. 27, 2011

(65) Prior Publication Data
US 2012/0042368 A1 Feb. 16, 2012

(30) Foreign Application Priority Data
Aug. 16, 2010 (KR) .............................. 2010-0078917

(51) Int. Cl.
*H04L 29/06* (2006.01)
*H04W 12/06* (2009.01)
*H04B 3/54* (2006.01)

(52) U.S. Cl.
CPC .............. *H04W 12/06* (2013.01); *H04L 63/18* (2013.01); *H04B 2203/5445* (2013.01); *H04B 2203/5441* (2013.01); *H04B 3/542* (2013.01); *H04B 2203/5416* (2013.01); *H04B 2203/5408* (2013.01)
USPC .......... 726/7; 726/3; 726/4; 726/25; 713/171; 713/172; 379/255; 379/329; 379/338; 379/349

(58) Field of Classification Search
CPC .................................................... H04W 12/06
USPC ........ 726/3, 7, 25; 340/870.02; 370/255, 338, 370/349, 329; 713/171, 172
See application file for complete search history.

(56) References Cited

U.S. PATENT DOCUMENTS

| | | | |
|---|---|---|---|
| 6,175,860 B1 | 1/2001 | Gaucher | |
| 7,986,642 B2* | 7/2011 | Ishimoto | 370/255 |
| 2005/0212688 A1* | 9/2005 | Chung | 340/870.02 |
| 2006/0038660 A1 | 2/2006 | Doumuki et al. | |
| 2007/0271360 A1* | 11/2007 | Sahita et al. | 709/223 |
| 2008/0186203 A1* | 8/2008 | Vaswani et al. | 340/870.11 |
| 2011/0277023 A1* | 11/2011 | Meylemans et al. | 726/7 |

FOREIGN PATENT DOCUMENTS

| | | | |
|---|---|---|---|
| GB | 2 407 938 A | | 5/2005 |
| GB | 2407938 A | * | 5/2005 |

OTHER PUBLICATIONS

Wireless LAN-3G integration: Unified mechanisms for secure authentication based on SIP; Veltri et al; Communications, 2006. ICC'06. IEEE International; 7 pages.*

(Continued)

*Primary Examiner* — Jason Lee
(74) *Attorney, Agent, or Firm* — Sughrue Mion, PLLC (57) ABSTRACT

A method and apparatus for automatically establishing a wired protected setup between an enrollee requesting registration and a registrar granting registration are provided. The method includes: determining whether a power line communication (PLC) between the enrollee and the registrar is possible; and if it is determined that the PLC with the registrar is possible, receiving a personal identification number (PIN) from the registrar through the power line and transmitting an acknowledgement (ACK) message to the registrar through the power line as a response to the received PIN.

24 Claims, 6 Drawing Sheets

(56) References Cited

OTHER PUBLICATIONS

"Layer 1 and 2 of a comprehensive LC System (Inhouse and Access); [Part n: Part element of title; [Sub-part m: Sub-part element of title]]", ETSI Draft; European Telecommunications Standards Institute (ETSI), 650, Route Des Lucioles; F-06921 Sophia-Antipolis; France, Mar. 22, 2007, pp. 1-38.

Communication dated Dec. 5, 2011, issued by the European Patent Office in corresponding European Patent Application No. 11165361.4.

* cited by examiner

METHOD FOR ESTABLISHING A PROTECTED SETUP AND WIRELESS REGISTRATION REQUESTING DEVICE IMPLEMENTING THE SAME

CROSS-REFERENCE TO RELATED APPLICATION

This application claims priority from Korean Patent Application No. 10-2010-0078917, filed on Aug. 16, 2010 in the Korean Intellectual Property Office, the disclosure of which is incorporated herein by reference in its entirety.

BACKGROUND

1. Field

Methods and devices consistent with exemplary embodiments relate to a method for establishing a protected setup and a wireless registration requesting device implementing the same, and more particularly, to a method for establishing a protected setup using a power line and a wireless registration requesting device implementing the same.

2. Description of the Related Art

IEEE802.1x provides an automatic, safe, out-of-band establishment of protected setup between a wireless device seeking to register on a network (Enrollee) and a wireless device granting registration (Registrar), each using different chipsets.

Figure 1:
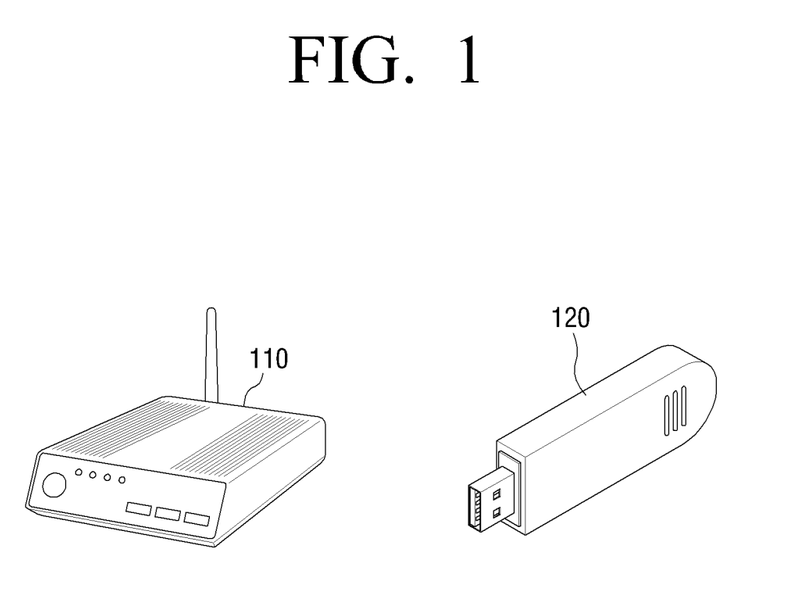
FIGS. 1 and 2 are views provided to explain related art devices establishing a protected setup.
Figure 2:
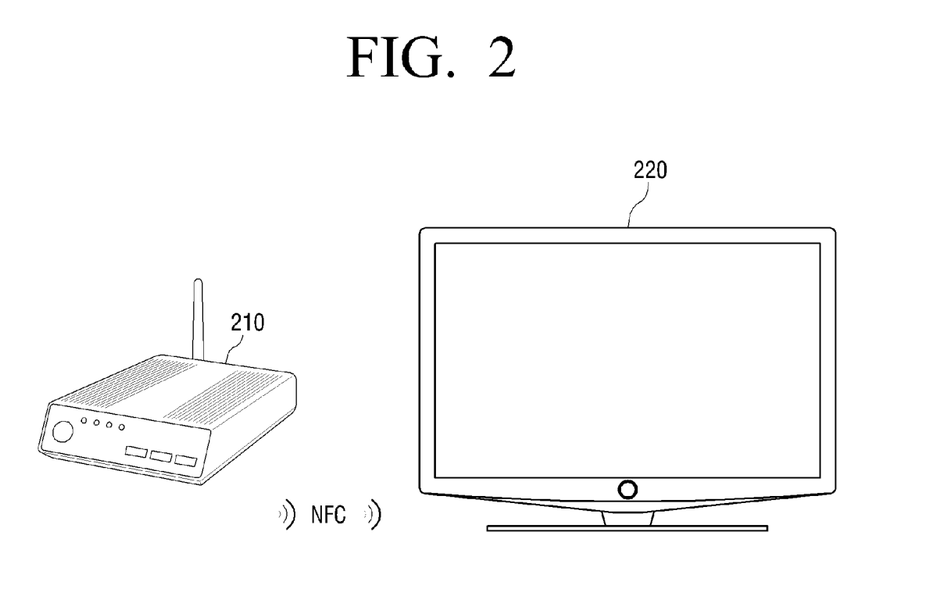

In a related art, the registrar 110 and 210 and the enrollee 120 and 220 are connected to each other as triggered by a push button, a wired tool such as USB as illustrated in FIG. 1, or by near field communication (NFC) as illustrated in FIG. 2.

However, these related art methods for connection require a human trigger, such as pushing a button, inputting a personal identification number (PIN), connecting a line, or bringing the devices close to each other.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a method for establishing a protected setup, which enables out-of-band establishment of security between an enrollee and a registrar (i.e., without requiring a human trigger) and an enrollee implementing the same.

According to an aspect of an exemplary embodiment, there is provided a method of an enrollee to establish a wired protected setup with a registrar in which the enrollee is a wireless device requesting registration and the registrar is a wireless device granting registration, the method including: determining whether it is possible to communicate with the registrar by a power line communication (PLC) or not; and if it is determined that the PLC with the registrar is possible, receiving a personal identification number (PIN) from the registrar and transmitting an acknowledgement (ACK) message to the registrar through a power line as a response to the received PIN.

The ACK may include a random value which is generated using the received PIN.

In an exemplary embodiment, after the transmitting the ACK, the method may additionally include performing tunneling with the registrar through the power line.

In an exemplary embodiment, the performing the tunneling may include performing authentication and association with the registrar through the power line.

The authentication and association may include transmitting an authentication request message to the registrar and receiving an authentication response message, and transmitting an association request message to the registrar and receiving an association response message.

In another exemplary embodiment, the performing tunneling may include performing EAP over LAN (EAPOL) protocol communication with the registrar through the power line.

The performing the EAPOL protocol communication may include transmitting an EAPOL start message, receiving an EAPOL request message, transmitting an EAPOL response message in response to the received EAPOL request message, and receiving a success message or a fail message regarding the EAPOL protocol communication.

In an exemplary embodiment, after the transmitting the ACK, the method may additionally include encapsulating or de-encapsulating between a frame for wireless communication and a frame for PLC, to perform the PLC with the registrar.

In another exemplary embodiment, if it is determined that PLC is possible, the method may additionally include determining whether communication with the registrar is possible or not.

The determining whether the communication with the registrar is possible or not may include using a hashed key mechanism.

The determining whether the communication with the registrar is possible or not may include determining whether the registrar and the enrollee are made by a same manufacturer.

According to an aspect of another exemplary embodiment, there is provided an enrollee for establishing a wired protected setup with a registrar in which the enrollee is a wireless device requesting registration and the registrar is a wireless device granting registration, the enrollee including: a power line communication (PLC) determining unit which determines whether it is possible to communicate with the registrar by a power line communication (PLC); and a PLC unit which receives a personal identification number (PIN) from the registrar and transmits an acknowledgement (ACK) message to the registrar as a response to the received PIN through a power line, if it is determined that the PLC with the registrar is possible.

The ACK may include a random value which is generated using the received PIN.

In an exemplary embodiment, the PLC unit may include a tunneling processing unit which performs tunneling with the registrar through the power line.

In an exemplary embodiment, the tunneling processing unit may perform authentication and association with the registrar through the power line.

The tunneling processing unit may transmit an authentication request message to the registrar, receive an authentication response message to perform the authentication process, transmit an association request message to the registrar, and receive an association response message to perform the association process.

In an exemplary embodiment, the tunneling processing unit may perform EAP over LAN (EAPOL) protocol communication with the registrar through the power line.

The tunneling processing unit may perform the EAPOL protocol communication by sending out an EAPOL start message, receiving an EAPOL request message, transmitting an EAPOL response message in response to the EAPOL request message, and receiving a success message or a fail message regarding the EAPOL protocol communication.

In an exemplary embodiment, the PLC unit may include a frame converting unit which encapsulates or de-encapsulates between a frame for wireless communication and a frame for PLC, to perform the PLC with the registrar.

In another exemplary embodiment, if it is determined that PLC is possible, the PLC unit may determine whether communication with the registrar is possible or not.

The PLC unit may determine whether the communication with the registrar is possible or not using a hashed key mechanism.

The PLC unit determines whether the communication with the registrar is possible or not by determining whether the registrar and the enrollee are made by a same manufacturer.

According to an aspect of another exemplary embodiment, there is provided a method of a registrar to establish a wired protected setup with an enrollee in which the enrollee is a wireless device requesting registration and the registrar is a wireless device granting registration, the method including: transmitting a personal identification number (PIN) to the enrollee through a power line; and receiving an acknowledgement (ACK) message from the enrollee through the power line as a response to the received PIN.

According to one or more exemplary embodiments, a wired protected setup is established automatically without requiring a human involvement.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Certain exemplary embodiments will now be described in greater detail with reference to the accompanying drawings.

In the following description, same drawing reference numerals are used for the same elements even in different drawings. The matters defined in the description, such as detailed constructions and elements, are provided to assist in a comprehensive understanding of exemplary embodiments. Accordingly, it is apparent that the exemplary embodiments can be carried out without those specifically defined matters. Also, well-known functions or constructions are not described in detail since they would obscure the exemplary embodiments with unnecessary detail.

Figure 3:
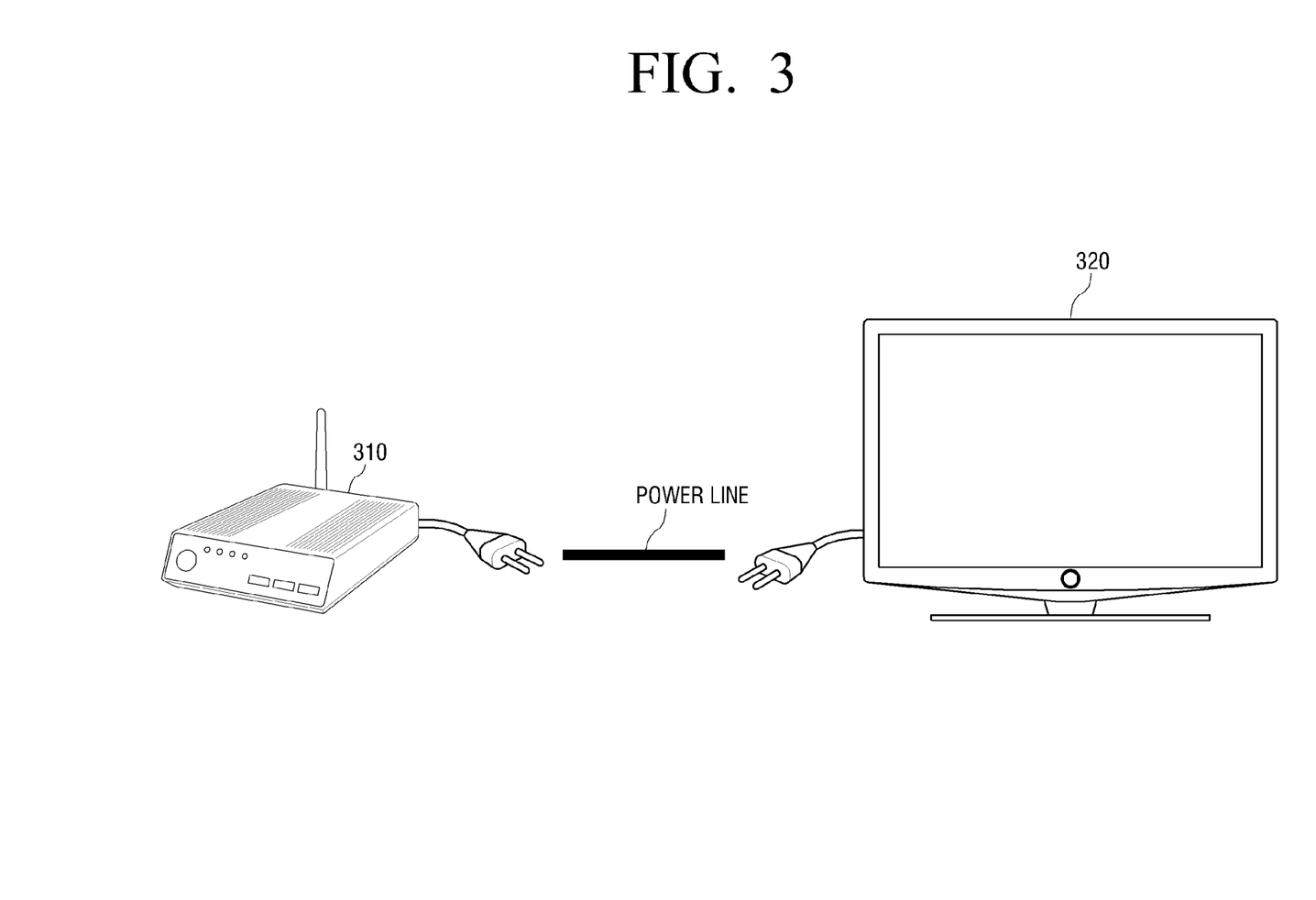
FIG. 3 is a view provided to explain devices establishing a protected setup via a power line according to an exemplary embodiment.

FIG. 3 is a view provided to explain devices to implement a method for establishing a protected setup using a power line according to an exemplary embodiment.

Referring to FIG. 3, a wireless device granting registration (i.e., a registrar 310) and a wireless devices seeking registration (i.e., an enrollee 320) perform communication with each other using power line communication.

Accordingly, the method for establishing a protected setup according to an exemplary embodiment may establish wired out-of-band (OOB) security using a power line instead of USB or NFC.

Figure 4:
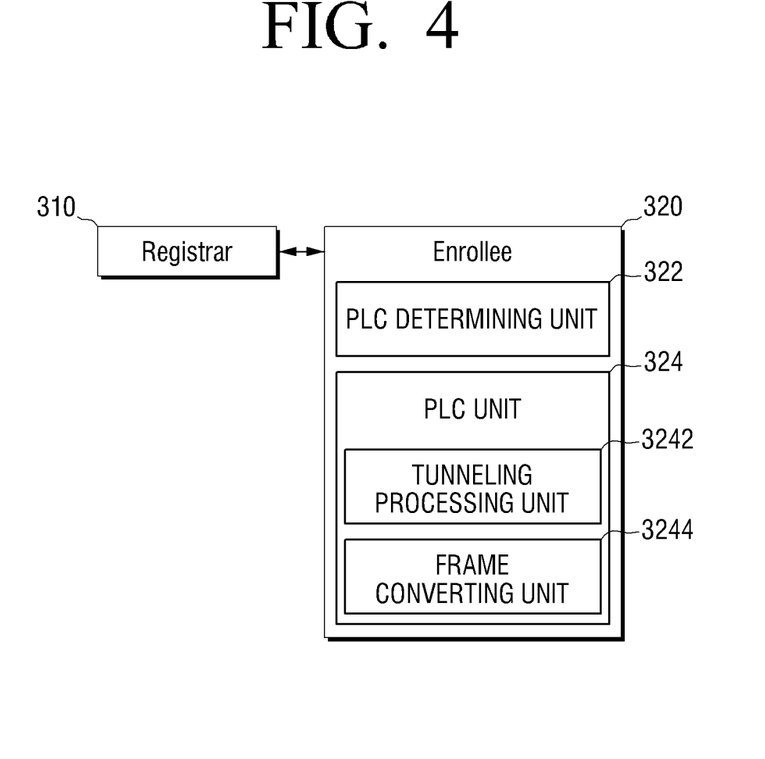
FIG. 4 is a schematic block diagram of a wireless device requesting registration which implements a method for establishing a protected setup according to an exemplary embodiment.

FIG. 4 is a schematic block diagram of the enrollee implementing the method for establishing a protected setup according to an exemplary embodiment.

The enrollee 320 is connected to the registrar 310 via a power line, and includes a power line communication (PLC) confirming unit 322 and a power line communication (PLC) unit 324. In the following description, detailed descriptions about the operations of the registrar 310 overlapping with those of the enrollee 320 will be omitted for the sake of brevity.

The PLC confirming unit 322 determines whether or not it is possible to communicate with the registrar 310 by power line communication, upon receipt of power applied to the enrollee 320.

That is, in response to power applied to the enrollee 320 and the registrar 310, the PLC confirming unit 322 performs a booting process, completes a series of system booting for each of the devices, and determines if the devices are able to transmit a personal identification number (PIN) for security setup based on communication via Ethernet over the power line.

The enrollee 320 and the registrar 310 for PLC may include a splitter with a filtering operation to prevent trans-border data flows in the PLC.

If it is determined that PLC is possible, the PLC unit 324 receives a PIN from the registrar 310 via the power line, and sends an acknowledgement message (ACK) to the registrar 310 as a response to the received PIN.

The ACK may include a random value generated using the received PIN. Meanwhile, the ACK may be in response to a user input, instead of a received PIN. Furthermore, the ACK may include a random value generated using the received PIN, or simply use the received PIN.

In an exemplary embodiment, if it is determined that PLC with the registrar 310 is possible, the PLC unit 324 may also determine if it is possible to communicate with the registrar 310. In other words, the PLC unit 324 may determine if the registrar 310 and the enrollee 320 can trust each other.

By way of example, the PLC unit 324 may open a TCP/IP socket to check if the registrar 310 and the enrollee 320 are from the same manufacturing company and thus can trust each other.

To be specific, the PLC unit 324 may determine the acceptability of communication with the registrar 310 using a hashed key mechanism, by which it is possible to determine whether both the registrar 310 and the enrollee 320 are devices made by the same vendor, i.e., by the same manufacturing company.

If it is determined that the registrar 310 and enrollee 320 can trust each other, the PLC unit 324 receives the PIN from the registrar 310 and the enrollee 320 stores the received PIN at a storage unit (not illustrated), which may be internal or external to the enrollee 320.

Meanwhile, referring to FIG. 4, the PLC unit 324 includes a tunneling processing unit 3242 and a frame converting unit 3244.

The tunneling processing unit 3242 performs tunneling with the registrar 310 via the power line.

Meanwhile, a Wi-Fi protocol is not operated between the enrollee 320 and the registrar 310 during tunneling between the enrollee 320 and the registrar 310. Accordingly, no tapping is allowed during tunneling.

The 'tunneling' herein refers to a core technology that enables use of a public network as a private network, which forms a virtual tunnel between two points of interest so that information can be exchanged without having any external interruption.

The core of tunneling may depend on: i) which of the Open Systems Interconnection (OSI) 7 layers performs the tunneling; and ii) up to which region the tunnel is formed. In other words, consideration is made regarding whether to form a tunnel end-to-end between a final user and the backbone, or between a VPN gateway or router in front of the backbone and the subscriber.

The methods of tunneling include tunneling by two or three layers of the OSI 7 layers. For example, the tunneling by two OSI layers includes a point-to-point tunneling protocol (PPTP) and a layer 2 tunneling protocol (L2TP), and the tunneling by three OSI layers includes Internet Protocol Security (IPSec).

In an exemplary embodiment, the tunneling processing unit 3242 may perform authentication and association with the registrar 310 via the power line. To be specific, the authentication involves sending an authentication request to the registrar 310, and receiving an authentication response as a response. The association involves sending an association request to the registrar 310 and receiving an association response as a response.

In an exemplary embodiment, the tunneling processing unit 3242 may perform Extensible Authentication Protocol (EAP) over local area network (LAN) (EAPOL) protocol communication with the registrar 310 via the power line. To be specific, the EAPOL protocol communication involves sending a start message to the registrar 310, receiving an EAPOL request, sending an EAPOL response to the registrar 310 as a response to the received EAPOL request, and receiving a success or fail message regarding the EAPOL protocol communication. The tunneling processing unit 3242 may send the EAPOL start message, receive the EAPOL request, send the EAPOL response, and receive a success or fail message of the EAPOL protocol communication, using a corresponding PIN.

In other words, the enrollee 310 and the registrar 310 transmit messages using the EAPOL protocol provided by the 802.1x standard. Although not illustrated, the registrar 310 may send out messages using remote authentication dial-in user services (RADIUS) with a Radius server as an authenticating server.

The EAP by 802.1x standard simply operates to request a connection, issue a challenge, and grant or refuse access, and does not actually make a determination regarding the authentication in use.

To utilize TCP/IP based power line communication (PLC), the frame converting unit 3244 encapsulates a frame for wireless communication into a frame for PLC through the power line to the registrar 310, and the frame for wireless communication as encapsulated is transmitted to the registrar 310 through the power line. Additionally, the frame for PLC transmitted to the registrar 310 is de-encapsulated into a frame for wireless communication.

Accordingly, although the wireless devices seeking registration by a method for establishing a protected setup according to an exemplary embodiment may be made by the same manufacturer, the devices do not have a risk of confusion since the devices use wired tunneling.

Furthermore, while the related art USB or NFC methods require a human trigger, according to an exemplary embodiment, the wireless devices seeking registration utilize wired tunneling via a power line, and it is thus possible to complete setup of wired security at a position where the registrar is installed without requiring the human trigger.

Although a wireless device seeking registration by a method for establishing a protected setup according to an exemplary embodiment is explained mainly with reference to an example of establishing a wired protected setup, another exemplary embodiment is not limited thereto. For example, the enrollee 320 may communicate wirelessly with the registrar 310 as in the example of a Wi-Fi protocol, or depending on user's choice, automatically perform a wired protected setup via the power line, or wireless protected setup using the Wi-Fi protocol.

Figure 5:
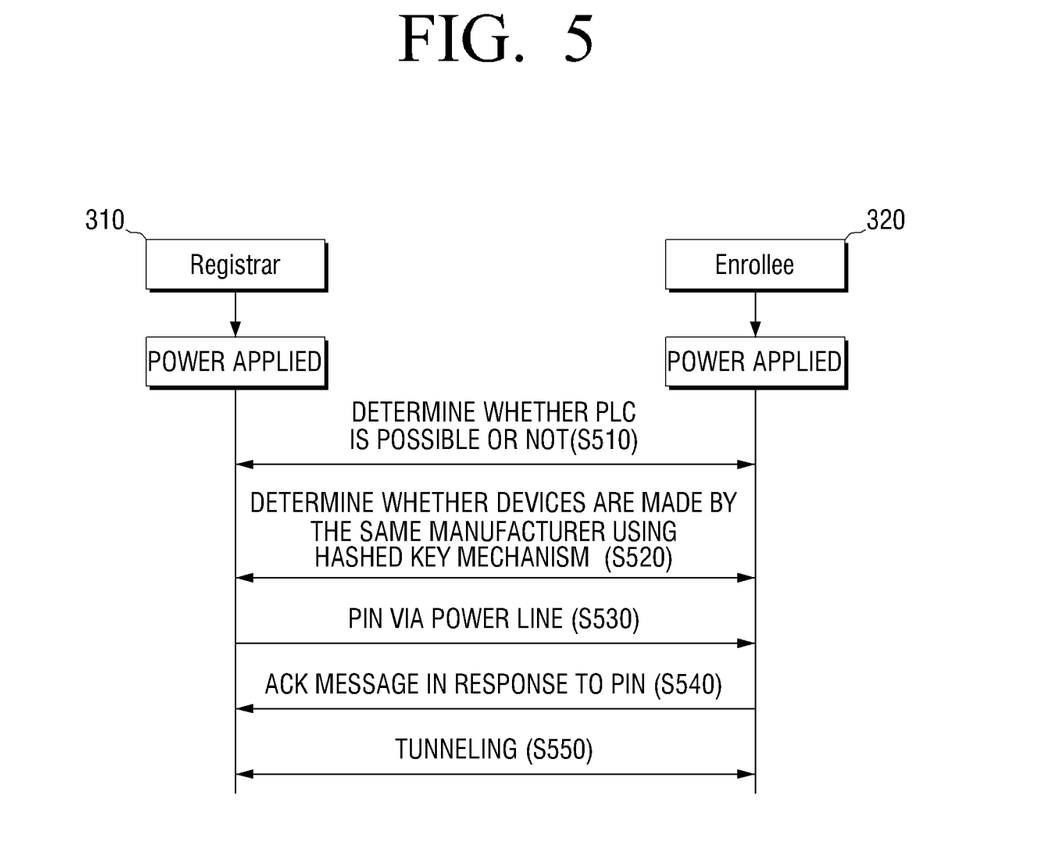
FIG. 5 is a flowchart illustrating a method for establishing a protected setup according to an exemplary embodiment.

FIG. 5 is a flowchart illustrating a method for establishing a protected setup according to an exemplary embodiment.

Referring to FIG. 5, at operation S510, when power is applied to the enrollee 320, it is determined whether power line communication (PLC) with the registrar 310 is possible or not.

That is, in response to power applied to the enrollee 320 and the registrar 310, a booting process is performed and completed, a series of system booting for each of the devices is completed, and it is determined whether the devices are able to transmit a PIN for security setup based on communication via Ethernet over the power line.

The enrollee 320 and the registrar 310 for PLC may include a splitter with a filtering operation to prevent trans-border data flows in the PLC.

If it is determined that PLC is possible, it is determined whether PLC with the registrar 310 is possible. For example, at operation S520, it is determined whether the enrollee 320 and the registrar 310 are made by the same manufacturer. In other words, it is determined whether the registrar 310 and the enrollee 320 can trust each other.

By way of example, the enrollee 320 may open a TCP/IP socket to check if the registrar 310 and the enrollee 320 are from the same manufacturing company and thus can trust each other.

To be specific, the enrollee 320 may determine the acceptability of communication with the registrar 310 using a hashed key mechanism, by which it is possible to determine both the registrar 310 and the enrollee 320 are devices made by the same vendor, i.e., by the same manufacturing company.

If it is determined that the registrar 310 and enrollee 320 can trust each other, the PLC unit 324 receives a PIN from the registrar 310 and the enrollee 320 stores the received PIN at a storage unit (not illustrated).

At operation S530, the PIN is received from the registrar 320 through the power line.

The enrollee 320 may receive the PIN from the registrar 310 and store the received PIN at a storage unit (not illustrated).

At operation S540, the enrollee 320 sends an acknowledgement (ACK) message in response to the received PIN.

The ACK may include a random value which is generated using the received PIN.

At operation S550, tunneling with the registrar 310 is performed via the power line.

The 'tunneling' herein refers to a core technology that enables use of public network as a private network, which forms a virtual tunnel between two points of interest so that information can be exchanged without having any external interruption.

The tunneling will be explained in greater detail below with reference to FIG. 6.

Figure 6:
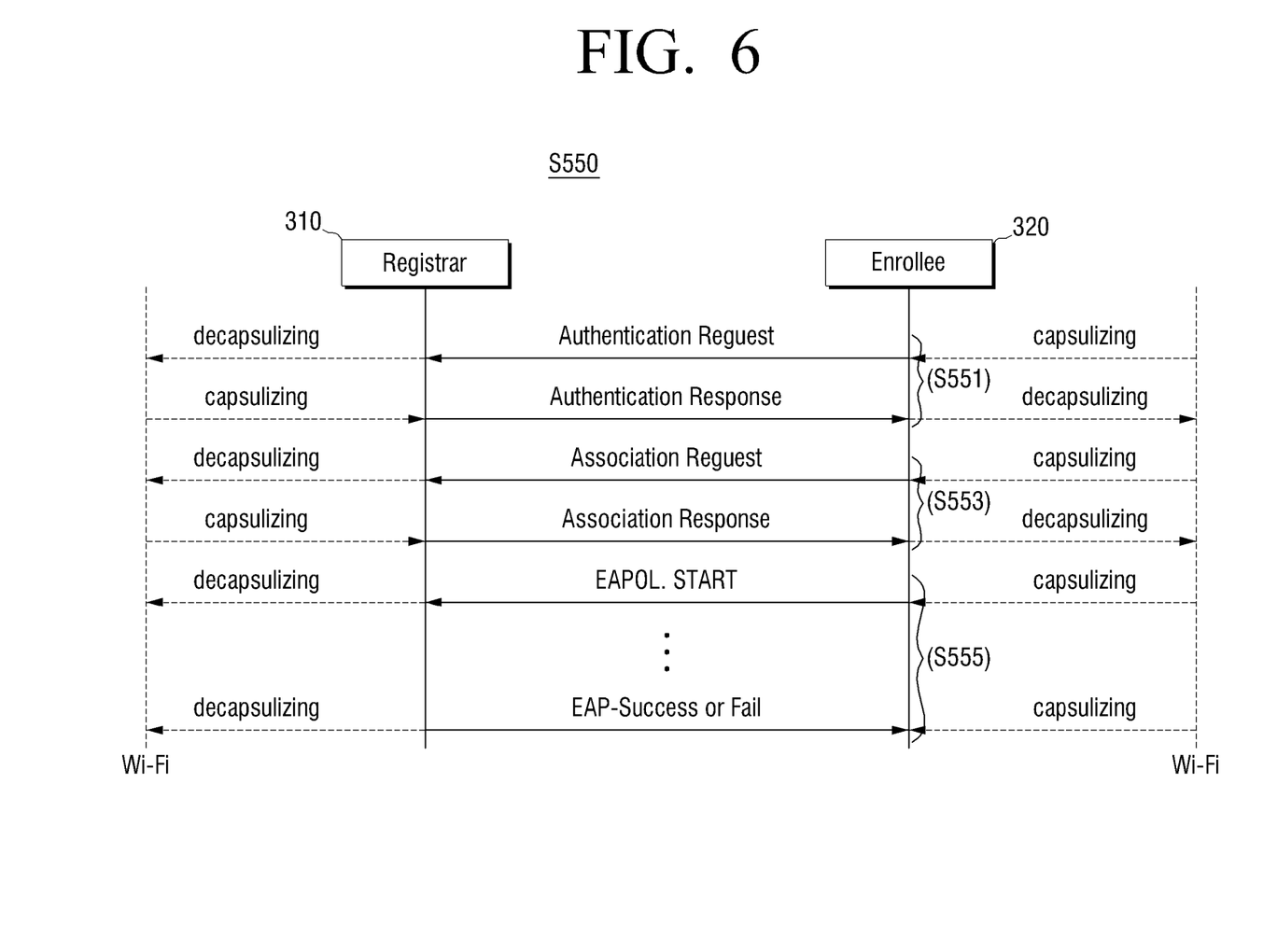
FIG. 6 is a flowchart illustrating a tunneling process in a method for establishing a protected setup according to an exemplary embodiment.

FIG. 6 is a flowchart illustrating a tunneling process in a method for establishing a protected setup according to an exemplary embodiment.

Referring to FIG. 6, the tunneling (S550) may include authentication with the registrar 310 via a power line at operation S551.

To be specific, the authentication at S551 may include sending out an authentication request message to the registrar 310, and receiving an authentication response message in return.

Next, at operation S553, association with the registrar 310 via the power line is performed.

To be specific, the association at S553 may include sending out an association request message to the registrar 310 and receiving an association request message in return.

Finally, at operation S555, EAPOL protocol communication with the registrar 310 is performed via the power line.

To be specific, the EAPOL protocol communication at operation S555 may include sending out an EAPOL start message using the PIN received and stored at the enrollee 320 to the registrar 310, receiving an EAPOL request message, sending out an EAPOL response message to the registrar 310 as a response to the received EAPOL request message, and receiving a success or fail message regarding the EAPOL protocol communication.

In other words, the enrollee 310 and the registrar 310 exchange messages through the EAPOL protocol provided by an 802.1x standard.

In an exemplary embodiment, the tunneling at S550 may include encapsulation or de-encapsulation between a frame for wireless communication and a frame for power line communication.

The frame for wireless communication may include, for example, an 802.11 frame, and the frame for PLC may include, for example, an 802.3 frame.

In other words, to utilize the PLC based on TCP/IP, the enrollee 320 encapsulates a frame for wireless communication into a frame for PLC to the registrar 310 through the power line, and the frame for wired communication as encapsulated is transmitted to the registrar 310 through the power line. The frame for PLC transmitted to the registrar 310 through the power line is de-encapsulated into a frame for wireless communication.

Accordingly, although the wireless devices seeking registration by a method for establishing a protected setup according to an exemplary embodiment may be made by the same manufacturer, the devices do not have a risk of confusion since the devices use wired tunneling.

Furthermore, while the related art USB or NFC methods require a human trigger, according to an exemplary embodiment, the wireless devices seeking registration utilize wired tunneling via a power line, and it is thus possible to complete setup of wired security at a position where the registrar is installed without requiring the human trigger.

Although a wireless device seeking registration by a method for establishing a protected setup according to an exemplary embodiment is explained mainly with reference to an example of establishing a wired protected setup, another exemplary embodiment is not limited thereto. For example, the enrollee 320 may communicate wirelessly with the registrar 310 as in the example of a Wi-Fi protocol, or depending on a user's choice, automatically perform the wired protected setup via a power line, or wireless protected setup using the Wi-Fi protocol.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, one or more units of the registrar 310 and enrollee 320 can include a processor or microprocessor executing a computer program stored in a computer-readable medium.

The foregoing exemplary embodiments and advantages are merely exemplary and are not to be construed as limiting. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A method of an enrollee to establish a wired protected setup with a registrar for registration in which the enrollee is a first wireless device requesting the registration and the registrar is a second wireless device granting the registration, the method comprising:
    determining whether a power line communication (PLC) between the enrollee and the registrar is possible;
    if it is determined that the PLC between the enrollee and the registrar is possible, further determining whether communication for receiving a personal identification number (PIN) with the registrar having the PIN is possible or not possible; and
    if it is determined that communication of the PIN with the registrar having the PIN is possible, receiving the PIN from the registrar through a power line and transmitting an acknowledgement (ACK) message to the registrar through the power line as a response to the received PIN; and
    performing tunneling with the registrar through the power line after the transmitting the ACK,
    wherein the performing the tunneling comprises performing Extensible Authentication Protocol (EAP) over local area network (LAN) (EAPOL) protocol communication with the registrar through the power line.

2. The method of claim 1, wherein the ACK includes a random value which is generated using the received PIN.

3. The method of claim 1, wherein the performing the tunneling comprises performing authentication and association with the registrar through the power line.

4. The method of claim 3, wherein the performing the authentication and the association comprises:
    transmitting an authentication request message to the registrar and receiving an authentication response message in response to the transmitted authentication request message; and
    transmitting an association request message to the registrar and receiving an association response message in response to the transmitted association request message.

5. The method of claim 1, wherein the performing the EAPOL protocol communication comprises:

transmitting an EAPOL start message;
receiving an EAPOL request message and transmitting an EAPOL response message in response to the received EAPOL request message; and
receiving a success message or a fail message regarding the EAPOL protocol communication.

6. The method of claim 1, further comprising, after the transmitting the ACK, encapsulating or de-encapsulating between a frame for wireless communication and a frame for PLC, to perform the PLC with the registrar.

7. The method of claim 1, wherein the determining whether the communication of the PIN with the registrar having the PIN is possible comprises using a hashed key mechanism.

8. The method of claim 1, wherein the determining whether the communication of the PIN with the registrar having the PIN is possible comprises determining whether the registrar and the enrollee are made by a same manufacturer.

9. The method of claim 1, wherein the determining whether the PLC between the enrollee and the registrar is possible, the receiving the PIN, and the transmitting the ACK are performed by the enrollee without a human trigger to the enrollee to trigger the wired protected setup.

10. The method of claim 1, wherein the determining whether the PLC between the enrollee and the registrar is possible comprises determining whether the PLC between the enrollee and the registrar is possible in response to an application of power to the enrollee.

11. An enrollee for establishing a wired protected setup with a registrar for registration in which the enrollee is a first wireless device requesting the registration and the registrar is a second wireless device granting the registration, the enrollee comprising:
at least one hardware processor which executes:
a power line communication (PLC) determining unit which determines whether a power line communication (PLC) between the enrollee and the registrar is possible; and
a PLC unit which receives a personal identification number (PIN) from the registrar having the PIN through a power line and transmits an acknowledgement (ACK) message to the registrar as a response to the received PIN through the power line, if it is determined that communication of the PIN with the registrar having the PIN is possible,
wherein the PLC unit comprises a tunneling processing unit which performs tunneling with the registrar through the power line using the at least one processor, after the transmitting the ACK, and
wherein, if it is determined that the PLC between the enrollee and the registrar is possible, the PLC unit further determines whether the communication for receiving the PIN with the registrar is possible or not possible,
wherein the tunneling processing unit performs Extensible Authentication Protocol (EAP) over local area network (LAN) (EAPOL) protocol communication with the registrar through the power line using the at least one processor.

12. The enrollee of claim 11, wherein the ACK includes a random value which is generated using the received PIN.

13. The enrollee of claim 11, wherein the tunneling processing unit performs authentication and association with the registrar through the power line using the at least one processor.

14. The enrollee of claim 13, wherein the tunneling processing unit transmits, using the at least one processor, an authentication request message to the registrar and receives an authentication response message in response to the transmitted authentication request message to perform the authentication, and transmits an association request message to the registrar and receives an association response message in response to the transmitted association request message to perform the association.

15. The enrollee of claim 11, wherein the tunneling processing unit performs, using the at least one processor, the EAPOL protocol communication by transmitting an EAPOL start message, receiving an EAPOL request message, transmitting an EAPOL response message in response to the received EAPOL request message, and receiving a success message or a fail message regarding the EAPOL protocol communication.

16. The enrollee of claim 11, wherein the PLC unit comprises a frame converting unit which, using the at least one processor, encapsulates or de-encapsulates between a frame for wireless communication and a frame for PLC, to perform the PLC between the enrollee and the registrar.

17. The enrollee of claim 11, wherein, if it is determined that the PLC between the enrollee and the registrar is possible, the PLC unit determines whether communication of the PIN with the registrar having the PIN is possible to determine whether the PLC between the enrollee and the registrar is possible using the at least one processor.

18. The enrollee of claim 17, wherein the PLC unit determines whether the communication of the PIN with the registrar having the PIN is possible using a hashed key mechanism using the at least one processor.

19. The enrollee of claim 17, wherein the PLC unit determines whether the communication of the PIN with the registrar having the PIN is possible by determining whether the registrar and the enrollee are made by a same manufacturer using the at least one processor.

20. A method of a registrar to establish a wired protected setup with an enrollee for registration in which the enrollee is a first wireless device requesting the registration and the registrar is a wireless device granting the registration, the method comprising:
determining whether a power line communication (PLC) between the enrollee and the registrar is possible;
if it is determined that the PLC between the enrollee and the registrar is possible, further determining whether communication for transmitting a personal identification number (PIN) to the enrollee is possible or not possible;
if it is determined that communication of the PIN with the enrollee having the PIN is possible, transmitting the PIN to the enrollee through a power line;
receiving an acknowledgement (ACK) message from the enrollee through the power line as a response to the received PIN; and
performing tunneling with the enrollee through the power line after the receiving the ACK,
wherein the performing the tunneling comprises performing Extensible Authentication Protocol (EAP) over local area network (LAN) (EAPOL) protocol communication with the enrollee through the power line.

21. A non-transitory computer readable recording medium having recorded thereon a program executable by a computer for performing a process of establishing a wired protected setup with a registrar for registration in which an enrollee is a first wireless device requesting the registration and the registrar is a second wireless device granting the registration, the process comprising:
determining whether a power line communication (PLC) between the enrollee and the registrar is possible;
if it is determined that the PLC between the enrollee and the registrar is possible, further determining whether communication for receiving a personal identification number (PIN) with the registrar having the PIN is possible or not possible; and if it is determined that communication of the PIN with the registrar having the PIN is possible, receiving the PIN from the registrar through a power line and transmitting an acknowledgement (ACK) message to the registrar through the power line as a response to the received PIN; and performing tunneling with the registrar through the power line after the transmitting the ACK, wherein the performing the tunneling comprises performing Extensible Authentication Protocol (EAP) over local area network (LAN) (EAPOL) protocol communication with the registrar through the power line.

22. A non-transitory computer readable recording medium having recorded thereon a program executable by a computer for performing a process of establishing a wired protected setup with an enrollee for registration in which the enrollee is a first wireless device requesting the registration and a registrar is a wireless device granting the registration, the process comprising:

transmitting a personal identification number (PIN) to the enrollee through a power line if it is determined that communication of the PIN with the enrollee having the PIN is possible after determining whether a power line communication (PLC) between the enrollee and the registrar is possible;

receiving an acknowledgement (ACK) message from the enrollee through the power line as a response to the received PIN; and performing tunneling with the enrollee through the power line after the receiving the ACK, wherein the performing the tunneling comprises performing Extensible Authentication Protocol (EAP) over local area network (LAN) (EAPOL) protocol communication with the enrollee through the power line.

23. The method of claim 1, wherein the tunneling forms a virtual tunnel between the enrollee and the registrar such that information is exchanged without any external interruption.

24. The method of claim 1, wherein the determining determines whether the PLC between the enrollee and the registrar is possible by opening up a TCP/IP socket in the registrar to verify that the enrollee and the registrar are capable of trusting each other.

* * * * *